Aug. 2, 1927.
M. P. HOLMES
1,637,568
ROTARY FLUID PRESSURE MOTOR
Original Filed Nov. 10, 1916   2 Sheets-Sheet 1
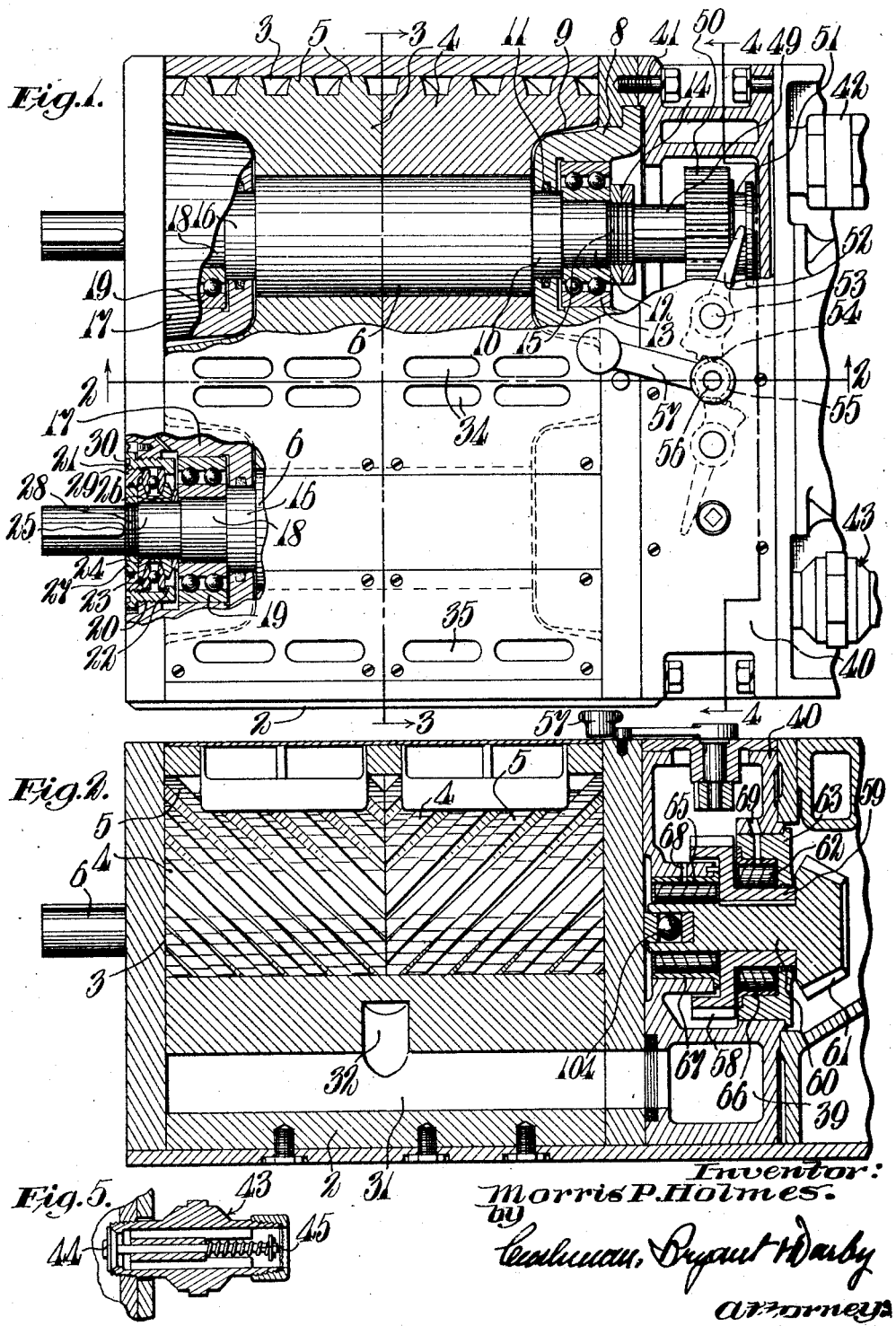
Inventor:
Morris P. Holmes
by
Cushman, Bryant & Darby
Attorneys Aug. 2, 1927. 1,637,568
M. P. HOLMES
ROTARY FLUID PRESSURE MOTOR
Original Filed Nov. 10, 1916  2 Sheets-Sheet 2
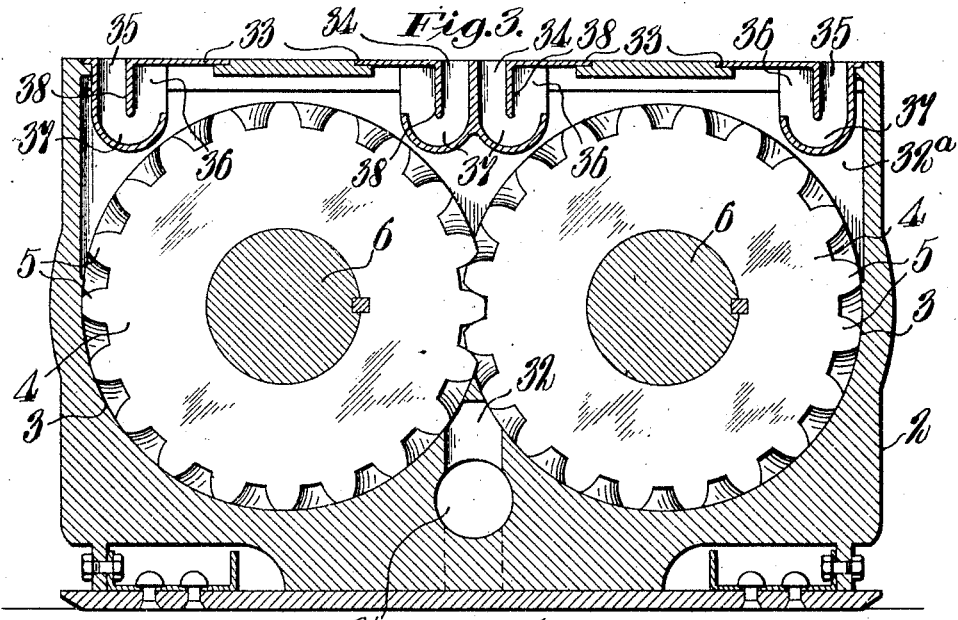
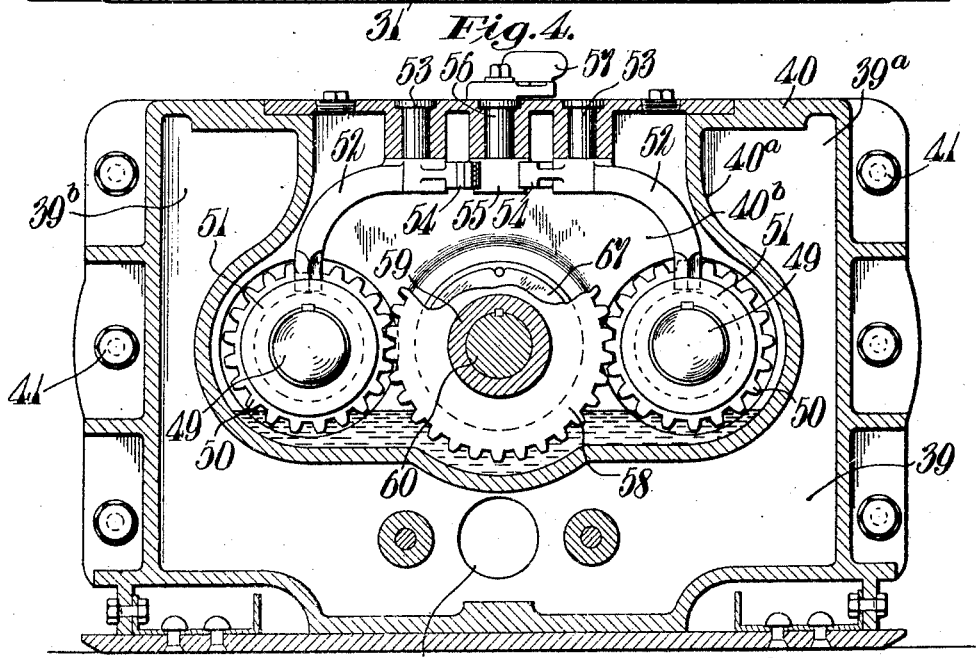
Inventor:
Morris P. Holmes.
by
Cushman, Bryant & Darby
Attorneys Patented Aug. 2, 1927.

1,637,568

UNITED STATES PATENT OFFICE.

MORRIS P. HOLMES, OF CLAREMONT, NEW HAMPSHIRE, ASSIGNOR, BY MESNE ASSIGNMENTS, TO THE JEFFREY MANUFACTURING COMPANY, OF COLUMBUS, OHIO, A CORPORATION OF OHIO.

ROTARY FLUID-PRESSURE MOTOR.

Original application filed November 10, 1916, Serial No. 130,579. Renewed April 21, 1922, Serial No. 555,916, Patent No. 1,544,398. Divided and this application filed September 4, 1923. Serial No. 660,803.

My invention relates to rotary fluid pressure motors, and more particularly though not exclusively to compressed air motors adapted especially for use in driving mining machines.

An object of my invention is to provide an improved motor. Another object of my invention is to provide an improved motor which is capable of developing relatively high power in proportion to its size and weight, which may be readily assembled and disassembled, and which is especially adapted by reason of its construction to use as the source of power on mining machines. Other objects and advantages of my invention will hereinafter more fully appear.

In the accompanying drawings I have shown for purposes of illustration one form which my invention may assume in practice.

In these drawings,—

Fig. 1 is a view largely in plan, but with parts broken away to show the internal construction of the motor.

Fig. 2 is a longitudinal vertical section on the line 2—2 of Fig. 1.

Fig. 3 is a transverse vertical section on the line 3—3 of Fig. 1 on an enlarged scale.

Fig. 4 is a transverse vertical section on the line 4—4 of Fig. 1 on an enlarged scale.

Fig. 5 is a detail sectional view of the relief valve mechanism.

In the illustrative disclosure shown the motor is of the general type disclosed in the patent to Van Deventer, No. 996,169, dated June 27, 1911, but constitutes an improvement over that motor in a number of particulars.

The motor herein comprises a motor casing 2 having suitable parallel, longitudinally disposed, intersecting bores 3 therein adapted to house the lower portions of a pair of parallel rotors 4. These rotors, as best shown in Fig. 2, are each provided with a series of spiral or helical tooth blades 5, those on one rotor being adapted to mesh with those of the other substantially along the central line of the motor casing, and the rotors are provided with shafts 6 supported in bearings in the motor casing 2. The right hand ends (observing Fig. 1) of each of the shafts 6 extend into removable bearing carrying head members 8 suitably attached to the motor casing and projecting into the bored out ends 9 of the rotors, the ends of the shafts being reduced as shown at 10 and surrounded by suitable oil retaining passages 11. Each shaft is also provided with a further reduced portion 12 around each of which is disposed a ball bearing 13 clamped in position by locking nuts 14 carried on the threaded extension 15 upon the shaft. The opposite ends of each of the shafts 6 are likewise similarly reduced as at 16 and extend into suitable bearing carrying head members 17 similar to the members 8, but herein preferably formed integral with the rear head of the motor casing. The rear ends of the shafts 6 are also provided with second reduced portions 18 around which ball bearings 19 similar in construction to the bearings 13 are arranged. In the present case, however, one of the head members 17 is provided with a threaded opening 20 of slightly greater diameter than the bore which receives the ball bearing 19 and in this threaded opening is carried a thrust adjusting member 21 having an inwardly disposed flange 22 at its front end. Against this flange there rests a ball thrust bearing 23 of the ball and split ring type, having its inner edge extending between a plurality of split rings 24 grooved on their adjacent sides to receive it and clamped on a further reduced portion 25 on the shaft 6. As shown, these rings 24 and a suitable ring 26 between the same and the bearing 19 are suitably locked in position by a lock nut 27 carried on a still further reduced and threaded portion 28 on the shaft 6, a cooperating ring 29 threaded on to the inner surface of the member 21 being disposed around the same and cooperating with the several parts just described to hold the same in position. Obviously, through this construction not only will the rotor shafts be provided with suitable journal bearings, but the thrust of the shafts will be absorbed, and any suitable adjustment of the bearing members to take up the thrust may be readily obtained through the adjustment of the member 21 as for instance by inserting a suitable tool in notches 30 therein, the member 21 then being locked in position by any suitable means. Attention is here also directed to the fact that this construction, wherein the bearings are extended into and are housed in the ends of the rotors, results in a very compact construction longitudinally, a feature of distinct importance where these motors are used for mining machine driving, as it renders possible the shortening of the length of the machine and so permits the necessary space in which the machine may be manœuvred to be kept at a minimum.

The motive fluid, which may be air, steam, or other pressure fluid, is supplied to the motor from a longitudinally disposed passage 31 located in the bottom of the casing and communicating with the rotors through an upwardly extending inlet 32. This inlet delivers the pressure fluid at a point below the mesh line of the rotor teeth and substantially at the point of intersection of the sets of teeth on each rotor so that the operation of the motive fluid in the tooth pockets results in the rotation of the rotors in opposite directions, the pressure fluid expanding as the rotors are revolved so that the air is more efficiently used, and the exhaust fluid escaping from the tooth pockets at the junction of the bores 3 with the chamber 32$^a$ formed between cover plates 33 and the tops of the rotors. This exhaust is allowed to pass out of the chamber 3 through outlets 34 and 35 in the top of the motor casing. The outlets 34 are disposed in the center line of the motor casing while the outlets 35 are disposed adjacent the sides of the motor casing and herein the center outlets are in the form of juxtaposed side outlets. It will be noted that these outlets are provided with apertures 36 communicating directly with the chamber 32$^a$ and with downwardly and upwardly disposed passages 37, extending down beneath baffle plates 38 and then upward and outward to the atmosphere. It will therefore be noted that the exhaust from the rotors is caused to pass out of the chamber 32$^a$ in such manner as not only to direct it away from the bottom of a mine when the machine is being used to drive a mining machine, so avoiding creation of dust, but also operating to carry out any dust or coal particles which might otherwise enter into the motor, these outlets being operative herein to protect the motor against wear of its parts due to ingress through the passages of gritty particles. By virtue of their shapes these parts constitute dust traps, as any dust tending to sift in will fall into and be caught in the bottom of the passages 37. The pressure fluid for rotating the rotors 4 is conducted to the passage 31 from a suitable chamber 39 formed herein in a supplemental head member 40 attached to the end of the motor casing by suitable bolts 41. The pressure fluid passage 39 is in turn provided with a suitable pressure fluid inlet 42 which may be controlled by suitable throttle valve mechanism so that the pressure fluid supply to the chamber 39 is regulated or interrupted as may be desired. The supply of lubricant to the motor will be effected by admitting suitable quantities into the incoming motive fluid.

Attention is now directed to a very important feature. In the use of motors of this type it will be discovered that if the inlet valve is closed and the rotors continue to rotate, as they will do for a short time due to inertia, a vacuum will be produced and the pressure of the atmosphere upon the entire upper surfaces of the rotors will cause excessive wear of the bearings and also grounding of the rotor tooth blades in the chambers in which they rotate with resultant wear and in many cases considerable sparking unless an excessive clearance is provided. To overcome this difficulty I have provided a relief valve mechanism which may be of any well known and suitable form to permit the entry of air at atmospheric pressure to the chamber 39 and to the motor when the pressure therein is reduced below atmospheric pressure as a result of the continued rotation of the rotors after the supply of pressure fluid has been cut off. Such a relief mechanism is indicated at 43 as an entirety and it comprises an air duct or tube supported in the wall of the chamber 39. It also comprises an inwardly opening check valve 44 normally held closed by a spring 45 and also held closed by pressure when fluid is being supplied to the chamber 39, this valve, however, being moved on a reduction of pressure below atmospheric in the chamber 39 to open position to permit the entrance of air to prevent the formation of a vacuum in the rotor chamber. It will be understood that the location of this valve mechanism is not necessarily as shown, but that it may be positioned also at the inner end of the air supply if desired. This relief valve mechanism is of great importance as it is found to be impossible for such a motor to be used in a mining machine in an efficient form without such a relief device, it being impossible on one hand to permit sparking due to the presence of gas and the consequent danger of explosion, while on the other hand, if danger of sparking is eliminated by increasing the clearance there is such a large leakage of air that the motor is rendered impracticable from the standpoint of economy. Moreover, even were the clearance to be increased as suggested, there would still be abnormal wear on the bearings for while the action of the air during rotation of the rotors under power tends to minimize wear due to the air pressure partially supporting the weight of the rotors, when the air is cut off there will be a very material increase in pressure upon the rotors due to the substantial downward force which results from formation of a vacuum in the tooth pockets. By the use of this relief valve mechanism a reasonably small clearance may be maintained and the dimensions of the rotor chambers and the positioning of the rotors may be so arranged that real operating efficiency is secured with an entire absence of sparking.

It will be noted that the right hand ends of the shafts 6 in Figs. 1 and 2 are provided with extensions 49 protruding beyond the threaded portions 15 thereon and that splined to each of these portions is a pinion 50 adapted to be shifted back and forth along the spline by means of a shipper link 51 and a suitable shipper member 52 pivoted at 53 on the supplemental head 40. As shown, these shipper members 52 are also provided with suitable interlocking mechanism of any desired form, herein shown to comprise rack portions 54 at their adjacent ends each meshing with an intermediate pinion 55 which is carried on a stud 56 and is rotatable by means of a suitable handle 57. As a result of this construction, when the handle 57 is rotated in one direction one shipper member 52 will be thrown in one direction and the other shipper member will be thrown in the opposite direction, causing opposite movements of the pinions 50 and throwing one of the same out of engagement with a gear 58, while the other is thrown into engagement with that gear. Thus it will be noted that the gear 58, while driven from either of two constantly oppositely rotating members, may be driven in either direction at will and that it is impossible for an operator to throw both pinions 50 into mesh with the gear 58 at the same time. The gear 58 is in turn provided with a sleeve 59 splined to a shaft 60 which is herein shown as integral with a cooperating bevel driving gear 61. Roller bearings 62 are provided between the sleeve 59 and a suitable removable bearing carrying member 63 located in the outer wall of the head 40, and a suitable thrust bearing 104, herein of the ball type, is arranged between the shaft 60 and the end of the motor casing to take the thrust of the pinion 61. The rear end of the shaft 60 is also preferably mounted in a roller bearing 65 and both of the roller bearings 65 and 62 are disposed in removable sleeves 66 and 67 supplied with lubricant through suitable lubricant ducts 68 and 69, respectively.

Here it should be noted that the supply and relief connections 42, 43 are arranged near the top of the motor and at opposite sides thereof. These communicate respectively with branches 39ª and 39ᵇ of the chamber 39, and a wall 40ª divides the chamber 39 from a compartment 40ᵇ in which the gears 50, 58, and related parts are disposed and run in lubricant.

From the foregoing description the mode of operation of this mechanism will be readily understood. Fluid having been admitted to the inlet 42, the same will pass through chamber 39 to the passage 31 and be admitted from the passageway 32 to the tooth pockets shortly after they begin to enlarge and acting therein will cause the rotors to rotate. The motive fluid will be cut off from the tooth pockets before they have reached their full volume and will thereafter work expansively and will be released at the moment that the forward ends of the pockets come into communication with the chamber 32ª. The exhaust fluid will then escape through the vents 34 and 35 by way of the ports 36 and passages 37, passing around the baffles 38 in exhausting. Depending upon the position of the handle 57, the motor will be operative to drive a driven member in either of two desired directions. When the fluid supply is interrupted, the rotors will continue to rotate for a short period due to their inertia but no damage will be done the bearings, the rotors, or the casing by reason of excessive pressure on the bearings or grounding of the rotors, for the relief mechanism 43 will open and prevent the formation of any substantial vacuum in the tooth pockets.

This application is a division of my application Serial No. 555,916, filed Nov. 10, 1916 and renewed April 21, 1922.

While I have in this application specifically described one form which my invention may assume in practice, it will be understood that this form of the same is shown for purposes of illustration and that the invention may be modified and embodied in other forms without departing from its spirit or the scope of the appended claims.

What I claim as new and desire to secure by Letters Patent is:

1. In a fluid pressure motor, a casing having a rotor chamber, a live pressure chamber below said rotor chamber and communicating therewith, an exhaust chamber above said rotor chamber and communicating therewith, a dust trap in said exhaust chamber for preventing foreign matter from entering said rotor chamber, and an exhaust port opening through the top of said casing leading from the exhaust chamber through said dust trap to the atmosphere.

2. In a fluid pressure motor, a casing having a plurality of intercommunicating rotor chambers, a live pressure chamber below said rotor chambers and communicating therewith, an exhaust chamber above said rotor chambers and communicating therewith, a plurality of orifices leading from said exhaust chamber to the atmosphere, and means constituting a baffle and a dust trap associated with each of said exhaust orifices, the exhausting fluid flowing through said baffle and dust trap.

3. In a fluid pressure motor, a casing comprising rotor chambers, a live pressure chamber below said rotor chambers and communicating therewith, chamber means for receiving the exhaust motive fluid communicating with said rotor chambers, and vent means leading to the atmosphere from said exhaust chamber means including means forming baffled passages through which the exhausting fluid flows.

4. In a fluid pressure motor, a casing comprising rotor chambers, a live pressure chamber below said rotor chambers and communicating therewith, chamber means for receiving the exhaust motive fluid communicating with said rotor chambers, and vent means leading to the atmosphere from said exhaust chamber means including means forming baffled passages of U-shape through which the exhausting fluid flows.

5. In a fluid pressure motor, a casing having a rotor chamber, a gear chamber at the end of said rotor chamber, and pressure fluid inlet passages extending around the exterior of said gear chamber and communicating with said rotor chamber, said pressure fluid inlet passages having provision at points at opposite sides of said gear chamber for the connection of fluid admission means.

6. In a fluid pressure motor, a casing having a rotor chamber, a supply passage extending beneath said rotor chamber, a gear chamber at the end of said rotor chamber, and pressure fluid inlet passages extending around the exterior of said gear chamber and communicating with said supply passage, said pressure fluid inlet passages having provision at points at opposite sides of said gear chamber for the connection of fluid admission means.

7. In a fluid pressure motor, a casing having a rotor chamber, and closures for said casing, a gear chamber formed on one of said end closures, and pressure fluid inlet passages extending around the exterior of said gear chamber and communicating with said rotor chamber, said pressure fluid inlet passages having provision at points at opposite sides of said gear chamber for the connection of fluid admission means.

8. In a fluid pressure motor, a casing having a plurality of rotor chambers, a live pressure chamber below and between said rotor chambers, an exhaust chamber above said rotor chambers, and end closures for said casing, one of said end closures having a gear chamber and pressure fluid inlet passages extending around said gear chamber and communicating with said pressure chamber in said casing, said pressure fluid inlet passages having provision at points at the opposite sides of said gear chamber for the connection of fluid admission means.

9. In a fluid pressure motor comprising a casing and a rotor therein, said casing having a branched inlet passage leading to said rotor at the bottom thereof, one of said branches being connected to a source of fluid pressure and the second having an inwardly opening check valve therein, and a plurality of vents leading from said casing to the atmosphere for exhausting the fluid from the top of said rotor.

10. In a fluid pressure motor, a casing having a rotor chamber, spaced exhausts communicating with said rotor chamber, a gear chamber at one end of said rotor chamber, and a plurality of fluid inlet passages extending around said gear chamber and communicating with said rotor chamber, one of said passages leading to a source of fluid pressure and another of said passages having an inwardly opening check valve communicating with the atmosphere.

11. In a fluid pressure motor, the combination with a casing providing a rotor chamber, of a rotor in said chamber having recessed ends, and anti-friction bearings for the rotor including elements rotatable on axes offset from the rotor axis and carried by the end walls of said chamber and projecting into the recessed ends of the rotor.

12. In a fluid pressure motor, the combination with a casing comprising a central section and two end sections secured to said central section, said central section having a rotor chamber and a pressure chamber communicating therewith, of a rotor in said rotor chamber having recessed ends, bearings for said rotor carried by said end sections within the recessed ends of said rotor, and grooves in said end sections between said bearings and said recesses for preventing leakage therebetween.

13. In a fluid pressure motor, a casing having intersecting rotor chambers, intermeshing rotors in said chambers, shafts to which said rotors are fixed, a gear chamber at the end of said rotor chamber, pressure fluid inlet passage means extending around the exterior of said gear chamber and communicating with said rotor chambers, said rotor shafts projecting into said gear chamber, a driving shaft intermediate said rotor shafts rotating on a fixed axis, and means in said gear chamber for connecting either of said rotor shafts to said driving shaft.

14. In a fluid pressure motor, a casing having intersecting rotor chambers, intermeshing rotors in said chambers, shafts to which said rotors are fixed, a gear chamber at the end of said rotor chambers, pressure fluid inlet passage means extending around the exterior of said gear chamber and communicating with said rotor chambers, said rotor shafts projecting into said gear chamber, a driving shaft intermediate said rotor shafts, and means in said gear chamber for connecting either of said rotor shafts to said driving shaft including gears in said gear chamber slidable longitudinally on said rotor shafts.

15. In a fluid pressure motor, the combination with a casing providing a rotor chamber, of a rotor in said chamber having a shaft and a recess surrounding said shaft at one end thereof, and means forming an end wall for said chamber and having a portion projecting into said recess and surrounding said shaft and an antifriction bearing housed in said portion and supporting said shaft, said bearing including elements rotatable on axes offset from the rotor axis.

16. In a fluid pressure motor, the combination with a casing providing a rotor chamber, of a rotor in said chamber having a shaft and a recess surrounding said shaft at one end thereof, and means forming an end wall for said chamber and having a portion projecting into said recess and surrounding said shaft, a chamber in said portion opening through the outer wall of said means and concentric with said shaft, and an antifriction bearing housed in said chamber and supporting said shaft and removable through the end of said chamber, said bearing including elements rotatable on axes offset from the rotor axis.

17. In a fluid pressure motor, the combination with a casing providing a rotor chamber, of a rotor in said chamber having a shaft and a recess surrounding said shaft at one end thereof, and means forming an end wall for said chamber and having a portion projecting into said recess and surrounding said shaft, a chamber in said portion opening through the outer wall of said means and concentric with said shaft, an antifriction bearing housed in said chamber and supporting said shaft and removable through the end of said chamber, said bearing including elements rotatable on axes offset from the rotor axis, and means for maintaining said bearing in position closing the open end of said chamber.

18. In a fluid pressure motor, a casing having a rotor chamber, end closures for said casing, a gear chamber on one of said end closures providing a lubricant bath, and pressure fluid supply means extending around said gear chamber and providing fluid admission connections at either side of the latter.

19. In a fluid pressure motor, a plurality of intermeshing rotors having spaced power shafts, a shaft between said spaced power shafts in fixed space relation to the latter, gears on said power shafts, a gear on said intermediate shaft, and means whereby either of said first mentioned gears may be caused to drive said gear on said intermediate shaft in opposite directions.

20. In a fluid pressure motor, a plurality of intermeshing rotors have spaced power shafts, a shaft intermediate the first mentioned shafts, gears one on each of said shafts, the gears on said power shafts being splined thereto and slidable longitudinally thereof and the gear on said intermediate shaft being fixed thereto, and means for alternately sliding said gears on said power shafts into mesh with said intermediately disposed gear to cause rotation of the latter in opposite directions.

21. In a fluid pressure motor, a plurality of intermeshing rotors having spaced power shafts, a shaft intermediate the first mentioned shafts, gears one on each of said shafts, the gears on said power shafts being splined thereto and slidable longitudinally thereof and the gear on said intermediate shaft being fixed thereto, means for supporting said intermediate shaft including bearings at opposite sides of the gear thereon, and means for alternately sliding said gears on said power shafts into mesh with said intermediately disposed gear to cause rotation of the latter in opposite directions.

22. In a fluid pressure motor, a rotor casing, rotors therein having intermeshing tooth blades, supply and exhaust chambers in said casing having supply and exhaust connections disposed respectively above and below the rotors, and a relief valve on said casing independent of said supply connection and communicating with the supply chamber therein.

23. In a rotary engine, the combination including a pair of intermeshing rotors each provided peripherally with means forming series of generally helically extending fluid pockets, a rib extending across the inlet side of said rotors parallel to their axes and in substantial conformity to a portion of their peripheries, said rib providing a fluid inlet, front and rear heads, shafts supporting said rotors and rotatable therewith and rotatably mounted in said heads, and fluid supply means communicating with said rotors through said inlet in said rib and comprising means forming supply passages leading to said inlet from points adjacent the opposite sides of said engine.

24. In a rotary engine, the combination including a pair of intermeshing rotors each provided peripherally with means forming series of generally helically extending fluid pockets, a rib extending across the inlet side of said rotors parallel to their axes and in conformity to a portion of their peripheries, front and rear heads, bearings carried by said front and rear heads, shafts supporting said rotors and rotatable therewith and rotatably mounted in said bearings, and fluid supply means for said motor including an inlet passage in said rib and passages leading thereto extending transversely of said engine below the plane of the rotor axes.

25. In a rotary engine, the combination with a pair of rotors each provided peripherally with means forming series of generally helically extending pressure receiving pockets, a casing for said rotors providing a rib extending across the lower side of said rotors parallel to their axes and in conformity to a portion of their peripheries, front and rear heads, bearings carried by said front and rear heads, shafts rotatable with said rotors and supporting the same and journaled in said bearings, said casing providing an exhaust chamber communicating with the upper surfaces of said rotors, fluid supply means for said rotors opening through said rib and including passages extending transversely of the engine below the plane of the rotor axes, and relief means constantly in communication with said fluid supply means and including an inwardly opening valve controlled by the pressure within said fluid supply chamber.

26. In a rotary engine, a casing providing a chamber having at its bottom bounding surfaces of a form corresponding to portions of the surfaces of intersecting cylinders, intermeshing rotors substantially corresponding in curvature to the curvature of the bottom of the chamber, fluid supply means opening through the bottom of the chamber and including passages extending transversely of the engine below the plane of the rotor axes, exhaust means opening from the chamber, and an automatically operative inwardly opening relief valve communicating with said supply means.

27. In combination, a motor having intermeshing rotors, an element driven by said motor, and means for selectively connecting said rotors to said element to drive the same in opposite directions including clutch means reciprocable longitudinally of the rotor axes.

In testimony whereof I affix my signature.

MORRIS P. HOLMES.